United States Patent

[11] 3,632,322

[72] Inventors David Gordon Loukes
Eccleston Park, Prescot;
William Ramsey Maltman, Prescot, both of England
[21] Appl. No. 765,428
[22] Filed Oct. 7, 1968
[45] Patented Jan. 4, 1972
[73] Assignee Pilkington Brothers Limited
Liverpool, England
[32] Priority Oct. 23, 1967
[33] Great Britain
[31] 48,049/67

[54] METHOD AND APPARATUS FOR PRODUCING GLASS HAVING A METALLIC SURFACE FINISH
10 Claims, 4 Drawing Figs.
[52] U.S. Cl. ................................................. 65/30,
65/99 A, 65/182 R, 117/124 C
[51] Int. Cl. ............................................. C03c 21/00
[50] Field of Search ........................................... 65/30, 114,
99 A, 182; 204/1; 117/124, 124 C

[56] References Cited
UNITED STATES PATENTS

| | | | |
|---|---|---|---|
| 2,904,432 | 9/1959 | Ross et al. ..................... | 65/30 X |
| 3,199,966 | 8/1965 | O'Connell et al. ............. | 65/182 X |
| 3,351,451 | 11/1967 | Barradell-Smith et al. .... | 65/99 X |
| 3,467,508 | 9/1969 | Loukes et al. ................. | 65/30 |
| 3,468,745 | 9/1969 | Navez et al. ................... | 65/30 |
| 3,486,995 | 12/1969 | Evers ............................ | 65/30 X |

Primary Examiner—S. Leon Bashore
Assistant Examiner—Saul R. Friedman
Attorney—Morrison, Kennedy & Campbell ABSTRACT: Method and apparatus for producing glass having a metallic surface appearance wherein the glass is supported on a molten metallic support while a protective atmosphere is maintained over the support. A molten metallic body is located in contact with an area of the upper surface of the glass with a source of oxidizing element confined in contact with the upper surface of the molten body and in nondestructive relationship with respect to the protective atmosphere. Controlled migration of the oxidizing element into the molten body controls the metallic migration from the molten body into the upper surface of the glass.

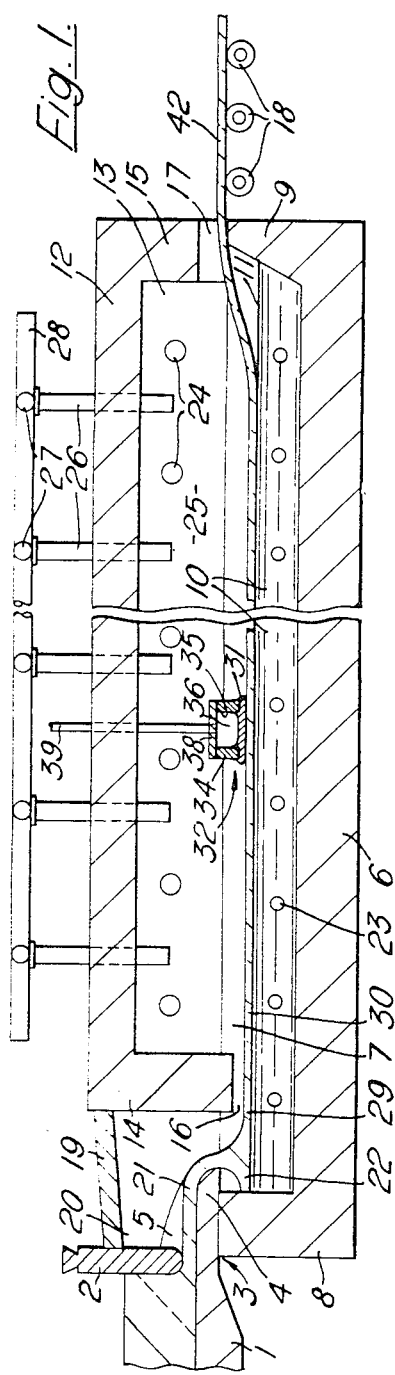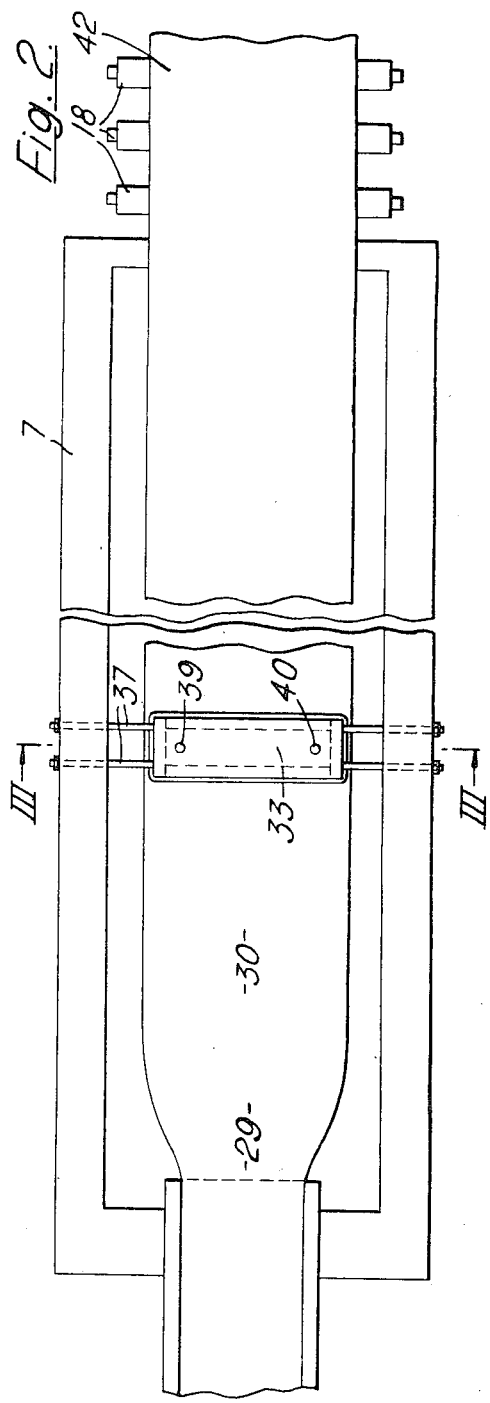

METHOD AND APPARATUS FOR PRODUCING GLASS HAVING A METALLIC SURFACE FINISH

BACKGROUND OF THE INVENTION

This invention relates to the manufacture of glass having desired surface characteristics.

More especially the invention relates to the production of glass having a concentrated metallic surface finish, for example in the production of mirrors and heat reflecting glass.

It is a main object of the present invention to provide an improved method and apparatus for effecting concentrated surface treatment of glass by controlling the migration of a metal into the surface of the glass.

The invention is based on the discovery that the migration of an element from material in contact with the hot glass surface, into the glass surface, can be controlled by regulating the oxidizing conditions at the interface between the material and the glass surface.

SUMMARY

According to the invention a method of producing glass having desired surface characteristics, comprises contacting a face of the glass while it is sufficiently hot to be modified with a material which modifies the glass under oxidizing conditions, and regulating the oxidizing conditions so as to control the migration of an element from that material into that face of the glass.

A preferred method according to the invention comprises contacting a face of the glass with a molten metal or alloy under oxidizing conditions.

Flat glass to which desired surface characteristics are to be imparted, is preferably supported on a molten metal surface, so that the surface treatment can be carried out at high temperatures, for example temperatures up to 900° C. without impairing the quality of the surfaces of the glass. From this aspect the invention provides a method of producing flat glass having a metallic surface appearance, comprising supporting glass on a molten metal surface, locating a body of a molten metal or alloy on the upper surface of the glass, and modifying the surface constitution of the glass by controlling the concentration of oxygen or sulphur in the molten body thereby controlling the migration of metal from the body into the upper surface of the glass.

It will be understood that the reference to oxidizing conditions is to be read in the broadest chemical sense as exemplified by the reference to oxygen or sulphur used in the preferred embodiments of the invention.

A molten alloy may constitute the molten body which contacts one face of the glass and the solute metal will usually be the metal which migrates from the alloy into the surface of the glass.

In a preferred embodiment the method according to the invention is applied to the manufacture of flat glass by the well-known float process as described in U.S. Pat. No. 3,083,551 in which a ribbon of glass is produced on a molten metal surface from molten glass delivered to the surface at one end of a bath of molten metal, to establish a layer of molten glass on the bath. The glass in the layer is advanced partly by momentum and partly by a traction effort directed longitudinally of the ribbon developed from the layer so that the molten glass fed to the bath is converted into continuous ribbon form and advanced under conditions such that it can be removed from the bath without harm to the glass.

The bath may be a bath of molten tin or of an alloy of tin in which tin predominates and which has a specific gravity greater than that of the glass. The protective atmosphere generally contains a reducing constituent, for example 5 percent of hydrogen. Alternatively the protective atmosphere which protects the exposed surface of the bath from oxidation may be simply an inert atmosphere, for example a nitrogen atmosphere.

The reducing effect of hydrogen in the protective atmosphere enhances the developing of the surface finish in the glass.

In the application of the invention to the float process there is located on the upper face of the advancing ribbon of glass a molten body of a metal or of an alloy, the molten body is segregated from the protective atmosphere over the bath, and the concentration of oxygen in the molten body is controlled thereby controlling the migration of an element from the molten body into the upper face of the ribbon of glass.

In one embodiment of the invention the molten body is segregated from the protective atmosphere by confining an oxidizing atmosphere above the molten body and the concentration of oxygen in the molten body is controlled by regulating the rate of flow of oxidizing gas through the confined atmosphere. The oxidizing atmosphere may for example be constituted by steam or an atmosphere of an inert gas for example nitrogen containing a proportion of oxygen, for example 1 percent of oxygen.

In another embodiment of the invention the concentration of oxygen in the molten body is regulated electrolytically. In this embodiment there is confined above the molten body a molten layer of an oxide of a constituent metal of the body, an electrolyzing current is passed through the molten body and the molten layer in a sense to release oxygen at the interface and the current is regulated to control the migration of oxygen into the molten body.

The invention also includes the treatment of glass articles for example glass sheets whether flat or curved, articles of pressed ware such as hollow glass blocks, electrical insulators and television tube face plates. Rolled glass may also be treated, for example patterned rolled glass and rolled glass sections for use as building elements.

From this aspect method according to the invention of producing a glass article having a metallic surface appearance comprises contacting the article while it is hot with a body of a molten metal which modifies the glass under oxidizing conditions to control migration of metal from that body into the contacted glass surface, separating the article and the molten body, and then exposing the article to a reducing atmosphere for sufficient time to develop a metallic stratum in the treated surface of the article.

The invention also comprehends apparatus for use in the manufacture of flat glass having desired surface characteristics, comprising a support for the flat glass, a locating member for maintaining a molten body of a metal or an alloy contacting one face of the glass, means for effecting relative movement between the glass and said locating member, and means for isolating an oxidizing material in contact with said molten body.

A preferred apparatus according to the invention comprises a tank structure containing a bath of molten metal, a roof structure defining a headspace over the bath, means for maintaining a plenum of protective atmosphere in the headspace, means for delivering glass at a controlled rate to the bath and for advancing the glass along the bath as a layer of molten glass in ribbon form, and wherein the locating member is a bar-shaped member mounted transversely of the path of travel of the glass and formed with an aperture extending downwardly through the bar, and the locating member is associated with means for maintaining oxidizing conditions within that aperture and over the upper surface of the molten body clinging to the bar-shaped member.

In one embodiment of the invention the apparatus includes a roof over the aperture through the locating member, a gas inlet and outlet through the roof for circulating an oxidizing atmosphere through the chamber so defined within the locating member, and means for regulating flow of the oxidizing atmosphere through the chamber.

In another embodiment of the invention the locating member is of electrically insulating refractory material, an electrode is fixed to the outside of the locating member so as to make electrical connection with a molten body clinging to the locating member, a second electrode is mounted in the aperture in the locating member so as to contact a molten layer of an oxide in the aperture, and a regulatable electric current supply circuit is connected to the electrodes in a sense to cause electrolytic migration of oxygen from the oxide layer into the molten body contacting the glass.

The invention also comprehends glass having a desired surface characteristic produced by a method as hereinbefore described.

BRIEF DESCRIPTION OF THE DRAWINGS

FIG. 1 is a sectional elevation of apparatus according to the invention including a tank structure containing a bath of molten metal, a roof structure over the tank structure, apparatus for pouring molten glass on to the bath and a locating member mounted above the bath to which a body of molten material clings and within which locating member a controlled oxidizing atmosphere is maintained.

FIG. 2 is a plan view of the apparatus of FIG. 1 but with the roof structure removed.

DESCRIPTION OF THE PREFERRED EMBODIMENT

Figure 3:
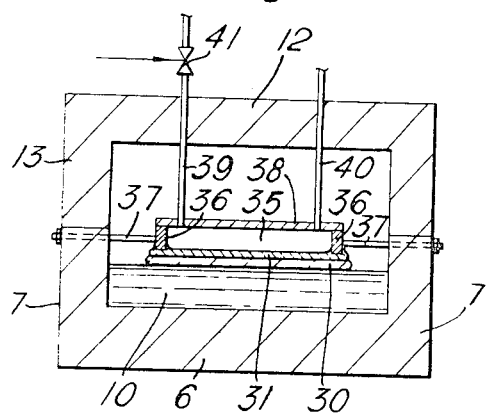
FIG. 3 is a section on line III—III of FIG. 2.

In the drawings like references indicate the same or similar parts.

Referring to FIGS. 1 and 2 of the drawings a forehearth of a continuous melting furnace is indicated at 1 and a regulating tweel at 2. The forehearth ends in a spout 3 comprising a lip 4 and side jambs 5, one of which is shown in FIG. 1. The lip 4 and side jambs 5 together constitute a spout of generally rectangular cross section. The spout 3 is disposed above the floor 6 of an elongated tank structure including sidewalls 7 joined together to form an integral structure with the floor 6, an end wall 8 at the inlet end of the tank and an end wall 9 at the outlet end of the tank. The tank structure holds a bath 10 of molten metal, whose surface level is indicated at 11. The bath is for example a bath of molten tin or of a molten tin alloy in which tin predominates and which has a specific gravity greater than that of the glass.

The roof structure is supported over the tank structure and the roof structure includes a roof 12, sidewalls 13 and integral end walls 14 and 15 respectively at the inlet and outlet ends of the tank structure. The inlet end wall extends down close to the surface 11 of the molten metal to define with that surface an inlet 16 which is restricted in height and through which molten glass is advanced as will be described below.

The outlet end wall 15 of the roof structure defines with the outlet end wall 9 of the tank structure an outlet 17 through which the ultimate ribbon of glass produced on the bath is discharged on to driven conveyor rollers 18 mounted outside the outlet end of the tank structure and disposed somewhat above the level of the top of the end wall 9 of the tank structure so that the ribbon is lifted clear of the wall 9 for discharge through the outlet 17.

The rollers 18 convey the ultimate ribbon of glass to an annealing lehr in well-known manner and also apply tractive effort to the ribbon of glass to assist in advancing the ribbon as it glides along the surface of the bath 10.

An extension 19 of the roof structure extends up to the tweel 2 and forms a chamber having sidewalls 20 in which the spout 3 is disposed.

Molten soda-lime-silica glass 21 is poured on to the bath 10 of molten metal from the spout 3. The tweel 2 regulates the rate of flow of the molten glass 21 over the spout lip 4. This lip is vertically spaced from the surface 11 of the bath so that there is a free fall of the molten glass through a distance of a few inches, which is exaggerated in FIG. 1 for the sake of clarity, to the level of the bath surface 11. This free fall is such as to ensure the formation of a heel 22 of molten glass behind the glass 21 pouring over the spout. The heel extends back to the inlet end wall 8 of the tank structure.

The temperature of the glass as it is advanced along the bath is regulated from the inlet end down to the discharge end by temperature regulators 23 immersed in the bath 10 and temperature regulators 24 mounted in the headspace 25 defined by the roof structure over the bath. A protective gas, for example a reducing gas containing a percentage of hydrogen e.g. 3 percent hydrogen, is supplied to the headspace through ducts 26 which are connected by branches 27 to a header 28 which is connected to a supply of the protective gas. Thus a plenum of protective gas is maintained in the substantially closed headspace and there is outward flow of protective gas through the inlet 16 and the outlet 17 from the headspace thereby inhibiting the entry of ambient atmosphere into the headspace over the bath.

The temperature of the molten glass 21 delivered to the bath is regulated so as to ensure that a layer of molten glass 29 is established on the bath. This layer 29 is advanced through the inlet 16 and during this advance there is free lateral flow of the molten glass under the influence of surface tension and gravity to the limit of free flow until there is developed on the bath surface from the layer 29 a buoyant body 30 of molten glass which is then advanced in ribbon form along the bath under the action of the tractive effort applied to the ultimate ribbon produced by the driven conveyor rollers 18.

The width of the tank structure at the surface level of the bath is greater than the width of the buoyant body 30 so that there is no limitation to the initial free lateral flow of the molten glass. In order to impart desired characteristics concentrated in one face of the glass, e.g. the upper face of the ribbon of glass, a body of a molten metal or a molten alloy of two or more metals, indicated at 31, is located in contact with the upper face of the advancing ribbon of glass. A bar-shaped locating member, indicated generally at 32, is mounted just above the path of travel of the ribbon of glass. This bar-shaped member is an integral member formed with a central elongated aperture 33, which is shown more clearly in FIG. 2, and the aperture is defined within front and rear walls 34 and 35 and end walls 36 integral with the walls 34 and 35. The bar-shaped member 32 is supported by struts 37 fixed into the end walls 36 and extending through the sidewalls 7 of the tank structure in order to support the member in its desired position.

The member 32 acts as a locating member for the body of molten metal or alloy 31 which clings to the member 32 and is suspended from that member in such a way as to be confined between the bottom of the member 32 and the upper face of the ribbon of glass. The weight of the body of molten metal or alloy 31 acting on the upper face of the advancing ribbon of glass is relieved by the clinging of the molten body to the locating member, it also prevents forward movement of the molten body with the glass.

Because the weight of the suspended molten metal or alloy is relieved by the clinging of the body to the member 32 the invention can be carried out even where the temperature of the glass is such that the glass is in a plastic condition, for example temperatures up to 900° C.

A roof 38 is fixed over the aperture 33 in the locating member 32 and as shown in the drawings extends right over the upper edges of the front and rear walls 34 and 35 and of the sidewalls 36 of the locating member. The roof is sealed on to the top of the aperture so as to define within the aperture a chamber in which an oxidizing atmosphere can be maintained completely segregated from the protective atmosphere maintained at a plenum over the bath of molten metal in the headspace 25. In this fashion, the oxidizing element in the embodiment of FIG. 3 is maintained in nondestructive relationship with respect to the protective atmosphere, i.e., the protective atmosphere will not interfere with the function of the oxidizing element and the oxidizing element will not interfere with the function of the protective atmosphere.

Oxidizing atmosphere, for example an atmosphere containing 1 percent oxygen and 99 percent nitrogen, or an atmosphere containing water in the form of steam as well as hydrogen and nitrogen, is fed into the chamber within the locating member through a gas inlet pipe 39 which extends downwardly through the roof structure 12 over the tank structure and through the roof 38 over the locating member. A gas outlet pipe 40 is provided at the other end of the locating member and the separation of these inlet 39 and outlet 40 ensures a good circulation of the oxidizing atmosphere through the chamber defined within the locating member. As shown in FIG. 3 a control valve 41 is fixed in the gas inlet pipe and by means of this valve the circulation of the oxidizing atmosphere through the chamber is controlled and so a control is achieved of the amount of oxygen dissolving in the body of molten metal or alloy 31. This regulation is effected in dependence on the length of the body of molten material considered in the direction of advance of the ribbon as well as the width of the ribbon being treated and the speed of the ribbon beneath the molten body as it is advanced along the bath of molten metal.

The rate of supply of oxidizing atmosphere is also regulated in accordance with the molten metal or molten alloy which is constituting the body 31. In the case of a simple metal the control is in relation to the amount of oxygen required by that metal to cause its migration into the upper face of the ribbon of glass. Usually the solute metal of an alloy migrates into the face of the glass ribbon and the control of the oxidizing atmosphere is in accordance with the nature of the solute metal of the alloy.

For the production of a highly reflective surface in the glass, for example for use as a mirror or as a heat reflecting film, it has been found advantageous to use molten bismuth. A continuous layer of bismuth in a reducible form is caused to enter the upper face of the glass ribbon by the continuous control of the oxidizing atmosphere over the bismuth and the upper face of the glass emerging from beneath the molten body of alloy 31 is rich in bismuth oxide. The reducing atmosphere in the headspace 25 over the bath causes reduction of this bismuth oxide rich surface with the resulting production of a bismuth rich layer in the ultimate ribbon of glass 42 which is discharged from the bath of molten metal.

Copper/bismuth alloys can also be used for effecting a controlled migration of copper from the alloy under the influence of the concentration of oxygen in the alloy, followed by reduction of this copper during the continued advance of the treated ribbon of glass along the bath of molten metal which reduces the resulting upper face of the ribbon to a copper mirror.

Alkali metal alloys, e.g. lithium/tin or sodium/tin alloys, may be employed in this same way. Controlled entry of lithium oxide or sodium oxide into the upper surface of the glass results in the production of a lithium oxide or sodium oxide rich surface which is valuable for the production of chemically toughened glass.

It is necessary to replenish the metal or the metal constituent of the alloy which is entering the upper surface of the ribbon of glass. In the case of copper/bismuth alloys for example the locating member may be a copper bar, and as copper migrates from the alloy into the bath surface, copper is dissolved from the bar into the alloy, in order to maintain the phase concentration of the alloy at the temperature of operation.

Alternatively, the solute metal may be added individually to the alloy.

The electrical conductivity of the metal film so produced in the upper face of the ribbon of glass can also be exploited. These metal films have been found to have a high conductivity since they are more continuous than those produced by other methods.

Dielectric oxide films can also be produced, for example those which reflect light by refractive index effects. In particular by employing a titanium alloy, titanium dioxide may be caused to enter the upper surface of the glass. In this case the protective atmosphere maintained in the headspace 25 over the bath of molten metal is a reducing atmosphere.

Protective films for the glass for example tin oxide films, which are abrasion resistant, may also be produced in the upper face of the glass by the method just described employing a controlled oxidation atmosphere. In this case the atmosphere over the bath is an inert atmosphere, for example a nitrogen atmosphere is employed.

Figure 4:
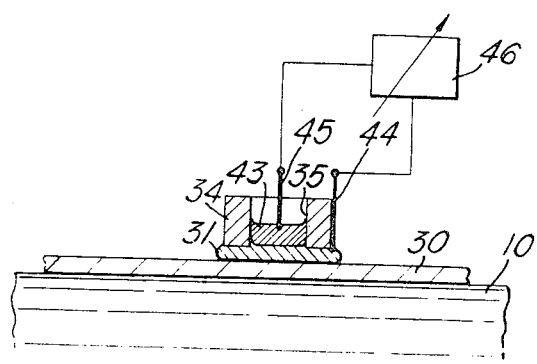
FIG. 4 is a sectional view similar to a part of FIG. 1 showing an alternative embodiment of the invention.

Another embodiment of the invention is illustrated in FIG. 4 and in this embodiment an electrolytic method is used for controlling the concentration of oxygen in the body 31 of molten metal or alloy. The locating member 34 is constructed in the same manner as the locating member in FIGS. 1 to 3 but is made of an electrically insulating refractory material. The body of molten metal or alloy 31 clings to the electrode and is located by the locating member in contact with the upper face of the glass ribbon, and within the aperture 35 in the locating member there is confined above the molten body 31 a molten layer 43 of an oxide of a constituent metal of the body. It will be appreciated that the oxidizing element in the embodiment of FIG. 4 is maintained in nondestructive relationship with respect to the protective atmosphere, i.e. the protective atmosphere will not interfere with the function of the oxidizing element and the oxidizing element will not interfere with the function of the protective atmosphere. Regarding the oxidizing element, it may be noted that, for example, when bismuth is to be caused to enter the upper face of the ribbon by reason of the presence of a controlled amount of oxygen in the bismuth, then the layer 43 is constituted by bismuth oxide. The bismuth oxide floats on the pool of bismuth alloy.

Alternatively the layer 43 may be constituted by boron oxide. An electrode 44, for example of carbon, is fixed to the outside of the locating member and extends downwardly so as to make electrical connection with the molten body 31 clinging to the locating member. A second carbon electrode 45 is mounted in the aperture in the locating member so as to contact the molten layer 43 of oxide which is confined in the aperture.

A regulatable electric current supply circuit 46 of any known kind is connected to the electrodes 44 and 45 in such a sense to cause the molten body 31 to act as an anode and the electrode 45 to act as a cathode so that there is electrolytic migration of oxygen from the layer 43 into the molten body 31. Regulation of the current flow regulates the amount of oxygen which flows into the pool and thereby regulates the migration of metal, for example bismuth, from the pool into the face of the glass ribbon which the pool contacts.

The invention thus provides an effective method of producing a concentrated surface characteristic in glass, for example in float glass in ribbon or sheet form, rolled glass sections and pressed glass articles and the invention also comprehends glass produced by the method of the invention, in which glass the surface concentration of a metal is high, giving good light reflection and heat absorption properties. For example in a surface layer of the glass which is about 0.2 microns thick the concentration of metal is of the order of 50 percent. Generally the invention can be applied anywhere in a glass manufacturing or treating process where the temperature at which the process is operating is sufficient to maintain the molten state of the body of molten metal or alloy contacting the glass, and in the case of the FIG. 4 embodiment also to maintain the layer of molten oxide in its molten state suitable for electrolysis.

We claim:

1. A method of producing glass having a metallic surface appearance, comprising supporting glass on a molten metallic support, maintaining a protective atmosphere at a plenum over said support, locating a molten metallic body on the upper surface of the glass, designating the area of contact of that molten body with the glass, confining a source of oxidizing element in contact with the upper surface of the molten body and in nondestructive relationship with respect to the protective atmosphere, migrating oxidizing element from said source into the molten body, and controlling that migration to regulate the concentration of oxidizing element in the molten body in dependence on said contact area and the time period of treatment of the glass by the molten body and thereby to control metallic migration from the molten body into the upper surface of the glass.

2. A method according to claim 1 of producing a glass article having a metallic surface appearance, comprising contacting the article while it is hot with said molten metallic body, separating the article and the molten body at the end of said period of treatment, and then exposing the article to a reducing atmosphere for sufficient time to develop a metallic stratum in the treated surface of the article.

3. A method of producing float glass having a metallic surface appearance, comprising advancing glass in ribbon form along a bath of molten metal, maintaining a protective atmosphere at a plenum over the bath, locating a molten metallic body on the upper face of the glass, designating the area of contact of that molten body with the glass, confining a source of oxidizing element in contact with the upper surface of the molten body and in nondestructive relationship with respect to the protective atmosphere, migrating oxidizing element from said source into the molten body, and controlling that migration to regulate the concentration of oxidizing element in the molten body in dependence on said contact area and the speed of advance of the ribbon of glass beneath the molten body thereby to control metallic migration from the molten body into the upper surface of the glass.

4. A method according to claim 3 comprising confining above the molten body a molten layer of an oxide of a constituent metal of the body, passing an electrolyzing current between the molten body and the molten layer to release oxygen at the interface, and regulating the current to control the migration of oxygen into the molten body.

5. A method according to claim 3, comprising confining an oxidizing atmosphere above said molten metallic body, segregating the confined oxidizing atmosphere from the protective atmosphere over the bath, and regulating a flow of oxidizing gas through said confined atmosphere to regulate the concentration of oxidizing element dissolved into the molten body.

6. A method according to claim 3, comprising confining an oxygen-containing atmosphere above said molten metallic body, segregating the oxygen-containing atmosphere from the protective atmosphere over the bath, and regulating the flow of oxygen-containing gas through said confined atmosphere to regulate the concentration of oxygen dissolved into the molten body.

7. Apparatus for use in the production of float glass, with a metallic surface appearance, comprising a tank structure containing a bath of molten metal, a roof structure over the tank structure and defining a headspace over the bath, means for maintaining a plenum of protective atmosphere in said headspace, means for delivering glass at a controlled rate to the bath and for advancing the glass along the bath as a layer of molten glass in ribbon form, an elongated bar-shaped locating member mounted across the tank structure transversely and just above the path of travel of the glass ribbon so as to be adjacent one face of the glass, means for maintaining a molten metallic body clinging by surface tension forces to said locating member, means associated with said locating member for confining a source of oxidizing element in contact with the located molten body in nondestructive relationship with respect to the protective atmosphere, and means enforcing a controlled migration of oxidizing element from said source into the molten metallic body so as to control metallic migration from the molten metallic body into said one face of the glass.

8. Apparatus according to claim 7, wherein the locating member is formed with an aperture extending downwardly therethrough within which the source of oxidizing element is confined.

9. Apparatus according to claim 8, including a roof over the aperture through the locating member, a gas inlet and outlet through the roof for circulating an oxidizing atmosphere through the chamber defined within the locating member, and means for regulating the flow of the oxidizing atmosphere through the chamber.

10. Apparatus according to claim 8, wherein the locating member is of electrically insulating refractory material, an electrode is fixed to the outside of the locating member so as to make electrical connection with a molten body clinging to the locating member, a second electrode is mounted in the aperture in the locating member so as to contact a molten layer of an oxide in the aperture, and a regulatable electric current supply circuit is connected to the electrodes in a sense to cause electrolytic migration of oxygen from the oxide layer into the molten body contacting the glass.

* * * * *